US010215624B2

(12) United States Patent
Cahill

(10) Patent No.: US 10,215,624 B2
(45) Date of Patent: Feb. 26, 2019

(54) INTEGRATED OPTICAL TAP MONITOR

(71) Applicant: II-VI Incorporated, Saxonburg, PA (US)

(72) Inventor: Michael Cahill, Dedham, MA (US)

(73) Assignee: II-VI Incorporated, Saxonburg, PA (US)

( * ) Notice: Subject to any disclaimer, the term of this patent is extended or adjusted under 35 U.S.C. 154(b) by 162 days.

(21) Appl. No.: 15/342,156

(22) Filed: Nov. 3, 2016

(65) Prior Publication Data

US 2018/0120150 A1 May 3, 2018

(51) Int. Cl.
*H01J 40/14* (2006.01)
*G01J 1/42* (2006.01)
*G01J 1/02* (2006.01)
*G01J 1/04* (2006.01)

(52) U.S. Cl.
CPC ............. *G01J 1/42* (2013.01); *G01J 1/0271* (2013.01); *G01J 1/0407* (2013.01); *G01J 1/0411* (2013.01); *G01J 1/0414* (2013.01); *G01J 1/0418* (2013.01); *G01J 1/0425* (2013.01); *G01J 1/0488* (2013.01)

(58) Field of Classification Search
CPC ......... G01J 1/0407; G01J 1/0411; G02B 6/42; G02B 6/4201; G02B 6/4204
USPC .......................... 250/216, 227.11; 385/48, 88
See application file for complete search history.

(56) References Cited

U.S. PATENT DOCUMENTS

| 6,798,553 | B1 | 9/2004 | Scobey et al. |
|---|---|---|---|
| 7,333,693 | B2 | 2/2008 | Nagata et al. |
| 7,492,994 | B1 | 2/2009 | He et al. |
| 8,664,584 | B2 | 3/2014 | Yang et al. |
| 2007/0036491 | A1* | 2/2007 | Suzuki ................. G02B 6/4204 385/89 |

OTHER PUBLICATIONS

Zhang, Hailiang, et al., "Novel Tunable Liquid Crystal Fabry-Perot Filters for Fiber-Optical System", Metro and Access Networks, Proceedings of SPIE vol. 4583, APOC 2001, Beijing, China (2001), pp. 64-72.

* cited by examiner

*Primary Examiner* — Kevin Pyo
(74) *Attorney, Agent, or Firm* — Wendy W. Koba

(57) ABSTRACT

An integrated optical tap monitor takes the form of a highly-reflective outer coating disposed over the active region of an associated photodetector. The coating is of a material that allows for a majority of the impinging optical signal to be re-directed into an output path, while passing a small portion of the signal into the photodetector's active region for monitoring purposes. The integrated configuration is small enough to be housed within a standard TO can, and additional optical components (filters, attenuators, etc.) may be co-located with the integrated tap monitor. By virtue of incorporating the monitoring function with a reflective surface, the integrated tap monitor may be substituted for a turning mirror at any place along a signal path and provide the benefit of power monitoring while also performing signal re-direction.

17 Claims, 4 Drawing Sheets

INTEGRATED OPTICAL TAP MONITOR

TECHNICAL FIELD

The present invention relates to an optical tap monitor and, more particularly, to an integrated optical tap monitor that utilizes a modified monitoring photodetector to function as both a reflective element and an optical detector.

BACKGROUND OF THE INVENTION

Optical monitoring of one or more optical signals is desirable in many applications. In general, a fraction of an optical signal is sampled by using a power splitter (tap) to out-couple a small portion of a propagating optical signal and direct this small portion into an optical detector to determine the power level (and/or other information) of the signal. The monitor power may be only a small fraction of the signal so that the measurement does not significantly affect the power level of the primary signal. Such optical monitoring may be implemented in fiber communication networks to monitor optical signals at selected locations.

Additionally, there are various types of "active" optical system components that need to be adjusted/tuned to meet certain operational requirements. For example, in multi-wavelength optical communication systems, it may be desirable to maintain an essentially uniform power level output signal at each wavelength. In fiber-based optical amplifiers utilizing multiple wavelengths, there is often a desire to maintain a particular gain distribution (including "flat") across the wavelength spectrum. These situations are considered to be exemplary only; there are various instances where it is desirable (if not necessary) to monitor optical signal power levels.

Typical configurations of optical tap monitors consist of at least three discrete components: a dual-fiber collimator, a highly-reflective dielectric mirror, and a photodetector disposed behind the mirror. FIG. 1 is a simplified diagram of this prior art configuration, illustrating a collimator 1, dielectric mirror 2 and photodetector 3. In operation, an optical signal propagating along an input fiber 4 passes through collimator 1 and dielectric mirror 2. The composition and thickness of dielectric mirror 2 is designed such that only a relatively small portion of the signal will be transmitted through dielectric mirror 2 to impinge photodetector 3, with the majority of the signal reflected by mirror 2. The reflected signal will again pass through collimator 1 and then be coupled into an output fiber 5. Photodetector 3 functions to convert the small transmitted portion of the optical signal into an electrical equivalent which can be further processed to provide a measurement of the optical power in this signal. The measured output from photodetector 3 may be used to assess the performance of the optical system in terms of the power present in the optical signal.

Conventional prior art designs of tap monitors include the following elements: (1) a 1×2 fused optical coupler designed to exhibit an X%/(100−X)% splitting ratio (e.g., 5%/95%), (2) a discrete element photodetector; and (3) a fiber splice that connects the low power output of the coupler to the photodetector. While this approach is relatively simple to implement, there is a need to perform alignments between the discrete components as the monitor is being assembled, as well as after the monitor is in place. Additionally, its use of discrete components means that the overall size of the tap monitor may be significant, and the included fiber splices need to be carefully formed and managed.

SUMMARY OF THE INVENTION

The needs remaining in the art are addressed by the present invention, which relates to an optical tap monitor and, more particularly, to an integrated optical tap monitor that utilizes a modified monitoring photodetector to function as both a reflective element and an optical detector.

In accordance with the present invention, the dielectric mirror component of a prior art tap monitor is eliminated and, in its place, a high reflectivity (HR) coating is added to the outer surface of the monitoring photodetector itself. Indeed, in some configurations a photodetector including a highly reflective outer surface may require fewer layers than a typical "anti-reflection" coating commonly applied to photodetectors. As long as the highly-reflective coating allows for a minimal percentage of light to pass through, the photodetector is able to provide the desired power monitoring function.

In one embodiment of the present invention, the HR-coated photodetector is disposed to intercept a free-space propagating optical input signal and re-direct the majority of the signal along an output signal path. The HR-coated photodetector, forming the integrated optical tap monitor of the present invention, may be disposed within a conventional optical housing (such as, for example, a TO can) that minimizes the footprint of the device. Indeed, other optical components may be disposed within the same housing with the integrated tap monitor, providing additional savings of space. For example, various types of tunable filters (e.g., thermally-tuned etalon wavelength filter, gain-flattening filter, or the like) may be disposed within the same housing as the integrated tap monitor. As long as the HR coating is sized to at least match the beam width of the optical signal, the configuration of the present invention is able to ensure that beam front will be completely reflected and no outer, peripheral regions of the beam will "miss" the reflector and be lost in the process.

In an alternative arrangement, an integrated tap monitor formed in accordance with the present invention may be used in place of a conventional turning mirror (without adding appreciably to the overall size or complexity of the configuration), thus providing the necessary passive signal re-direction function of the turning mirror while adding the capability to monitor the propagating signal at that point.

The integrated tap monitor can be used to detect radio-frequency signals (such as dither signals) as well as provide a monitoring of DC power level, as long as the active region of the photodetector used in the integrated tap monitor substantially matches the beamwaist of the tapped-off signal that passes through the HR coating and enters the photodetector. In some configurations, a broad area photodetector may be used (such as for providing DC monitoring or monitoring of relatively low frequency signals), while in situations where it is desired to detect radio-frequency signals, a high-speed photodetector is preferred. In any case, it is to be understood that for maximum power detection, the size of the incoming light beam needs to be compatible with the active region of the monitoring photodiode. Alternatively, if the size of the light beam is larger than the active area (commonly referred to in the art as "overfill"), the designer must account for the reduced signal from the monitoring photodiode as a fraction of the light beam would be outside the active area and thus not detected.

A particular embodiment of the present invention utilizes a dual-fiber collimator to provide the input and output optical signal paths to the integrated optical tap monitor.

One exemplary configuration of the present invention may be defined as an optical tap monitor comprising a photodetector including an active region for converting a received optical signal into an electrical equivalent thereof, and a high reflectivity coating disposed over an outer surface of the photodetector to create an HR-coated photodetector, the high reflectivity coating configured to reflect a majority of a propagating optical signal impinging the surface thereof, and pass a remaining portion of the propagating optical signal into the active region of the photodetector for conversion into an electrical monitoring signal, the reflected majority of the propagating optical signal forms an optical output signal of the optical tap monitor.

Another exemplary configuration may be defined as an optical tap monitor comprising a high-speed photodetector including an active region for converting a received optical signal into an electrical equivalent thereof, and a high reflectivity coating disposed over an outer surface of the photodetector to create an HR-coated photodetector, the high reflectivity coating configured to reflect a majority of a propagating optical signal impinging the surface thereof, and pass a remaining portion of the propagating optical signal into the active region of the photodetector for conversion into an electrical monitoring signal wherein the propagating optical signal exhibits a beam size compatible with the active region of the high-speed photodetector and the reflected majority of the propagating optical signal forms an optical output signal of the optical tap monitor.

Other and further embodiments and aspects of the present invention will become apparent during the course of the following discussion and by reference to the accompanying drawings.

BRIEF DESCRIPTION OF THE DRAWINGS

Referring now to the drawings, where similar drawings represent like elements in several views.

DETAILED DESCRIPTION

Tap monitors are commonly used to measure the power of a signal passing through an optical fiber by tapping off a portion of the light from the primary signal path and then directing this tapped-off portion into an associated photodetector. By knowing the ratio of the tap, the power of the signal continuing to propagate along the primary signal path can be accurately estimated. The power measurement output from a tap monitor can then be used to report the signal strength at the tap location along the optical system, and/or provide a feedback signal that is used to control one or more optical elements in the system.

Figure 1:
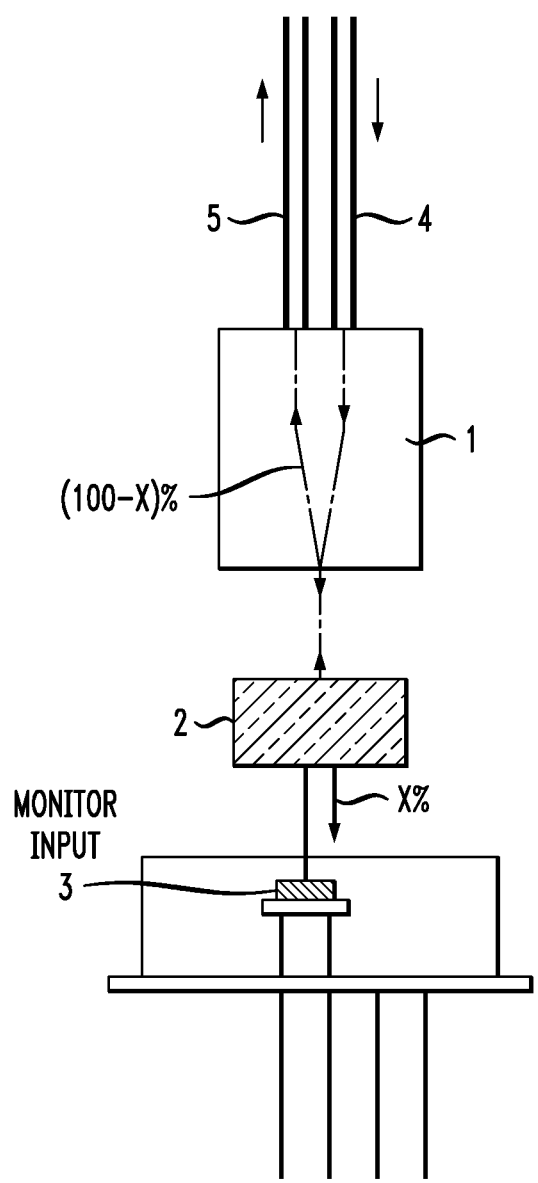
FIG. 1 is a diagram of a conventional prior art tap monitor, formed of discrete components.
Figure 2:
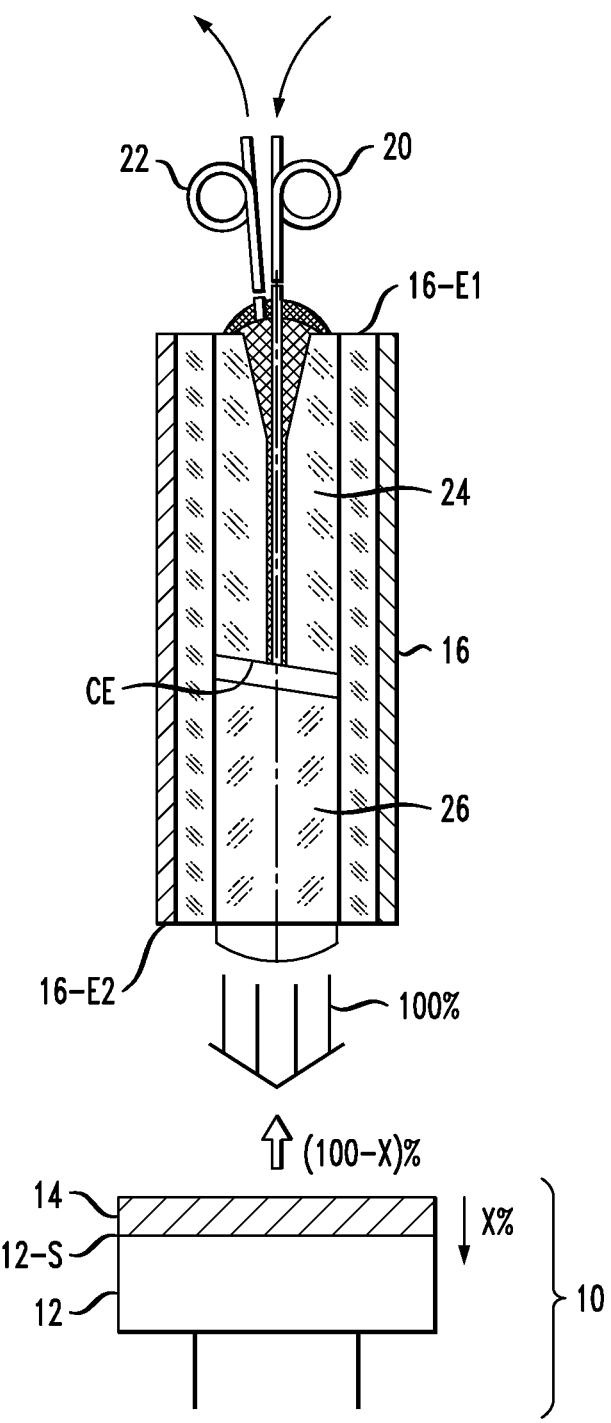
FIG. 2 illustrates an optical arrangement utilizing an integrated optical tap monitor formed in accordance with the present invention.

FIG. 2 illustrates an exemplary integrated tap monitor 10 formed in accordance with the present invention, in this case illustrated as used in combination with a dual-fiber collimator. In this embodiment, integrated tap monitor 10 comprises a photodetector 12 and a layer 14 of high reflectivity (HR) material disposed to cover top surface 12-S of photodetector 12. Photodetector 12 may comprise, for example, a broad-area GaAs photodetector having an active region on the order of about 200 μm. HR layer 14 may comprise a material selected from the group consisting of: tungsten, aluminum, copper, zinc, gold, silver, titanium, tantalum, chromium, tin, cobalt, nickel, or any alloys of these materials. In accordance with the present invention, HR layer 14 is formed of a composition and a thickness such that only a small fraction of light impinging layer 14 will pass into the active region of photodetector 12 (say, 10% or less, and preferably less than 5%). The comparative thickness of HR layer 14 with respect to photodetector 12 as shown in FIG. 2 is exaggerated, and only for the sake of illustration. It is to be understood that these reflectivity values and exemplary only and various other values may be used, thus while the following discussion describes the use of a "high" reflectivity coating, the actual amount of reflectively encompassed within the definition of "high" may be as little as, for example, 50% or as much as 99% (for example), depending on the particular application.

In the particular embodiment shown in FIG. 2, a dual-fiber collimator 16 utilized in association with integrated tap monitor 10 to provide paths for the optical input and output signals. Here, dual-fiber collimator 16 is shown including a pair of optical fibers 20, 22 coupled into a first endface 16-E1 of collimator 16. Specifically, optical fibers 20 and 22 are processed such that their respective core regions are enclosed within a fiber connector ferrule 24 component of collimator 16. As shown, fiber connector ferrule 24 is formed to exhibit a cleaved endface CE within the interior of collimator 16, with core regions of optical fibers 20 and 22 terminating at cleaved endface CE. It may be presumed that an optical signal being monitored is propagating along optical fiber 20 and is introduced into dual-fiber collimator 16.

Also housed within collimator 16 is a cylindrical lens element 26. In operation, cylindrical lens 26 will collimate the (expanding) optical signal introduced by optical fiber 20, providing a collimated optical output at the exit along a second endface 16-E2 of collimator 16. This collimated signal is then presented as the input to integrated tap monitor 10 formed in accordance with the present invention.

By properly controlling the composition and thickness of HR layer 14, it is possible to reflect a majority of the incoming optical signal back into endface 16-2E of dual-fiber collimator 16, while providing a sufficient signal level to photodetector 12 to allow for the desired monitoring function to proceed in a conventional manner. It is to be understood that the surface area extent of HR layer 14 needs to be sufficient to at least match the beamwaist of the collimated signal, otherwise portions of the collimated signal may not impinge HR layer 14 and thus impact not only the operation of photodetector 12 but the p power level of the signal reflected back into the system. Additionally, as mentioned above, the active region of the photodetector must also be sized to provide a proper measurement of the portion of signal passing through HR layer 14.

Presuming the power level of collimated input signal exiting endface 16-2E is defined as 100%, HR layer 14 functions to transmit x% of the signal into photodetector 12, and reflect (100−x)% of the signal back into collimator 16 via endface 16-2E. In one exemplary embodiment, HR layer 14 is configured to reflect about 90% of the incoming signal within the wavelength range of 1520-1620 nm, and exhibit a ripple less than about 0.2 dB. It is contemplated that the specific material(s) utilized to form HR layer 14 may be selected to exhibit wavelength-specific properties (e.g., providing "broadband" reflectivity, or providing reflectively within only a selected wavelength region, etc.). Preferably, HR coating 14 is designed to have very low polarization-dependent loss (PDL) for both the reflected signal (i.e., the signal directed back into cylindrical lens 26) and the transmitted signal (i.e., the signal entering the underlying layers forming photodetector 12). The HR coating is created via the deposition of materials with alternating refractive index to create a distributed Bragg reflector (DBR). Typical materials used for this type of coating include, for example, silicon dioxide ($SiO_2$) as the low-index material and tantalum pentoxide ($Ta_2O_5$) as the high-index material. The number of alternating layers used in this structure depends on the application, and can range from a few pairs to tens of pairs, with each layer typically having a thickness less than one micron.

Figure 3:
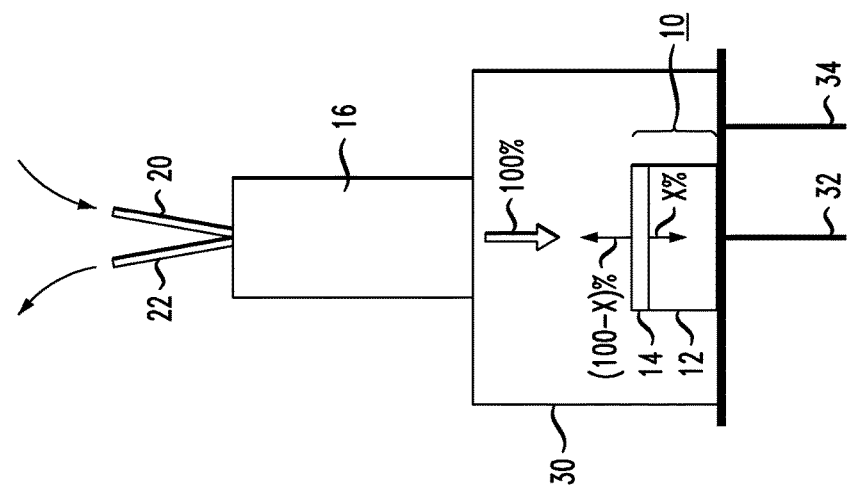
FIG. 3 is a simplified diagram of a configuration similar to that of FIG. 2, where in this case the inventive integrated optical tap monitor is disposed in a conventional optical housing.

FIG. 3 illustrates a simplified view of an exemplary arrangement including inventive integrated tap monitor 10, where in this case integrated tap monitor 10 is located within a conventional housing 30 typically found in optical systems (and generally referred to in the art as a "transistor outline" package, or "TO can", a commonly-used package for housing optical components). Also shown in FIG. 3 is collimator 16, aligned with an optical "window" (not shown) of housing 30, with fibers 20, 22 coupled to collimator 16.

The anode and cathode connections of photodetector 12 are coupled to pins 32 and 34 of housing 30, creating an output path for the electro-optic output signal. Many optical assemblies and subassemblies utilize TO can housings, making the ability to provide an integrated tap monitor in this type of package a useful alternative. While this specific configuration is exemplary only, it is an aspect of the present invention that the integrated tap monitor requires very little space and eliminates the need for additional submounts, alignments, etc., as found in prior art arrangements that required the utilization of a separate dielectric filter/mirror element.

Figure 4:
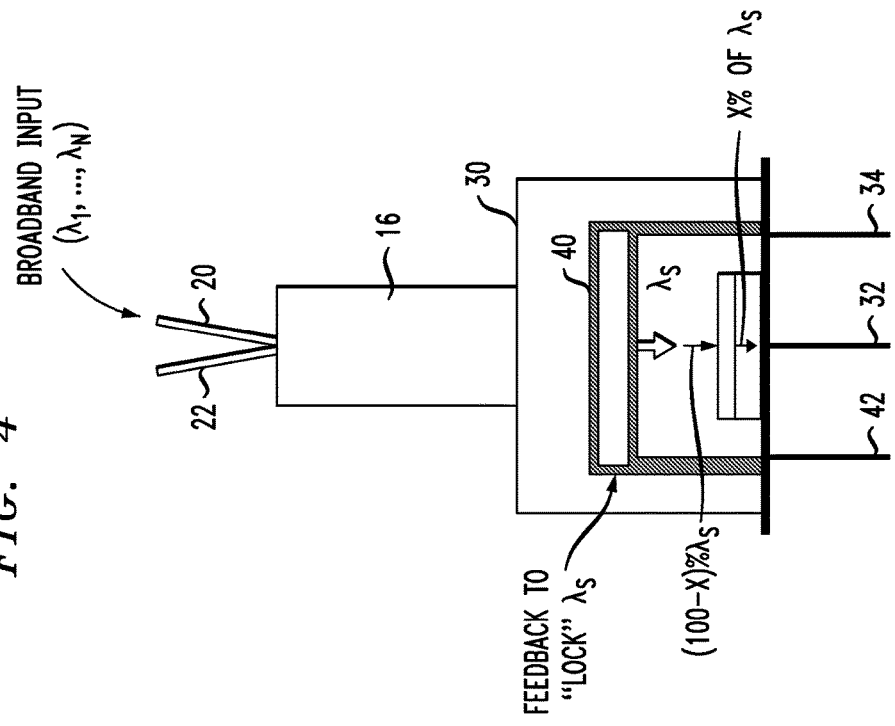
FIG. 4 is an arrangement similar to that of FIG. 3, in this case further incorporating another optical component in the housing with the integrated optical tap monitor.

As mentioned above, one advantage of the integrated structure of the present invention is that it may be housed in a package with other optical elements. FIG. 4 illustrates an embodiment of the present invention where an etalon tunable optical filter (ETOF) 40 is disposed within housing 30 with integrated optical tap monitor 10. ETOF 40 is used to control the specific wavelength(s) that are passed from an input fiber (such as optical fiber 20) to an output fiber (such as optical fiber 22).

An ETOF is known as an inexpensive tunable optical filter that can be used to filter out undesired light (e.g., amplified spontaneous emission (ASE), adjacent channels, etc.). However, the ETOF requires closed-loop control via a post-filter power measurement in order to lock onto the signal of interest over typical time and temperature ranges. This requirement means that the ETOF requires a tap monitor and, therefore, in prior art configurations would exhibit an increase in its overall size and complexity (as well as cost).

Thus, the utilization of the inventive integrated tap monitor 10 in combination with an ETOF 40 as shown in FIG. 4 addresses and overcomes the problems associated with conventional prior art designs. In accordance with this embodiment of present invention, the reflectivity of HR layer 14 is designed to be relatively broadband (i.e., similar bandwidth as ETOF 40, for example, perhaps from 1520-1620 nm) and therefore able to reflect a large percentage of whatever signal wavelength is selected to pass through ETOF 40 (here, represented as $\lambda_s$) and transmit only a small portion of the signal operating at wavelength $\lambda_s$ into photodetector 12. For example, HF layer 14 may be formed to reflect 90% of the signal operating at any wavelength within the spectral range of ETOF 40 (here, $\lambda_s$) and transmit 10% of the selected wavelength signal into photodetector 12. Thus, the power in the detected signal is sufficient to monitor the selected wavelength of interest. The power is monitored and if it is found to drop below a predetermined level, an adjustment signal is sent to ETOF 40 to tune the filter back to selected wavelength $\lambda_s$. In another embodiment, HF layer 14 may be designed to be spectrally selective and either pass or reflect specific wavelengths of interest.

While not specifically shown, it is to be understood that the integrated tap monitor of the present invention may be used to provide signal monitoring at any location in an optical system where a reflective surface is used to provide re-direction of a propagating optical signal. For example, turning mirrors in various integrated optic subassemblies may be re-configured as "taps" by replacing the turning mirror with an HR-coated photodetector.

Figure 5:
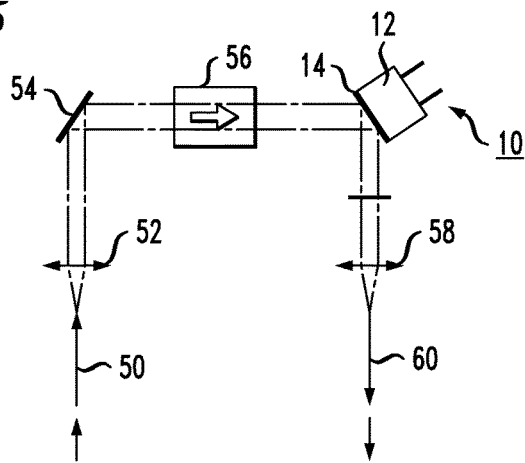
FIG. 5 illustrates a conventional optical system where a conventional turning mirror is replaced by an integrated tap monitor of the present invention.

FIG. 5 illustrates an arrangement where a conventional turning mirror is replaced with an integrated tap monitor 10 formed in accordance with the present invention. In this case, an incoming optical signal exits from an optical input 50 (as an expanding beam signal). Thereafter, the expanding signal is passed through a collimator 52 (collimator/lenses indicated in FIGS. 5-7 by the use of double-ended arrows) and re-directed by a turning mirror 54 to pass through an optical isolator 56. The isolated signal is ultimately focused by a lens 58 into an optical fiber 60. While conventional arrangements utilize a second turning mirror at the output of isolator 56, an integrated optical tap monitor 10 formed in accordance with the present invention is used in its place in this arrangement. As a result, integrated tap monitor 10 is able to provide the desired signal re-direction at the output of isolator 56, while also monitoring the power level of the signal at the output of isolator 56.

Figure 6:
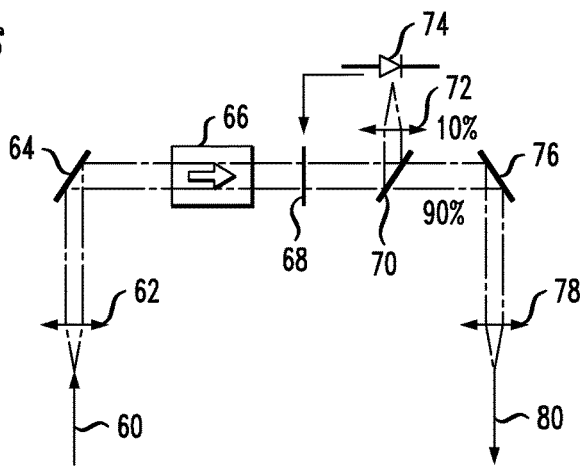
FIG. 6 is a diagram of an exemplary stage of a prior art fiber-based optical amplifier (a gain-flattening filter stage), requiring the use of an optical tap and photodetector monitoring device.

As mentioned above, one exemplary use of an integrated tap monitor of the present invention is in conjunction with optical amplifiers. FIG. 6 is a prior art diagram of an exemplary stage of a multi-wavelength optical amplifier. Similar to the configuration of FIG. 5, the arrangement of FIG. 6 includes an input fiber 60 for introducing the (multi-wavelength) amplified input signals to the arrangement. An optical collimator 62 and turning mirror 64 are used to direct the multi-wavelength amplified signals through an isolator 66. In accordance with the provision of this exemplary amplifier, a gain-flattening filter (GFF) 68 is positioned at the output of isolator 66. It is presumed that a requirement for this amplifier is that each wavelength experiences the same amount of gain. GFF 68 is a well-known device that can be adjusted to even out the amount of gain for each signal.

In this prior art configuration, an optical tap 70 is disposed at the output of GFF 68, directing a certain percentage of the amplified signals through a focusing lens 72 and into a monitoring photodetector 74. The measurements provided by photodetector 74 are used to adjust the position of GFF 68 and achieve a flat gain profile. As shown, the majority of the amplified signals pass through optical tap 70 and are re-directed by a turning mirror 76 to pass through a focusing lens 78 and exit the amplifier along output fiber 80.

Figure 7:
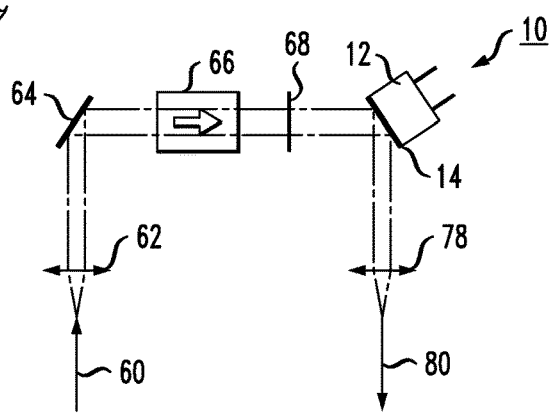
FIG. 7 is a revised version of the gain-flattening filter stage of FIG. 6, where an integrated optical tap monitor of the present invention is utilized to replace multiple discrete components found in the prior art arrangement.

FIG. 7 illustrates an improved version of the amplifier shown in FIG. 6, where a number of the discrete components utilized to provide the monitoring and signal re-directing functions are replaced by integrated tap monitor 10 formed in accordance with the present invention. In comparing the arrangements of FIGS. 6 and 7, the difference in overall size is easy to see. In particular, the discrete optical tap 70, lens 72, photodetector 74 and turning mirror 76 of the prior art arrangement are replaced by the single-component integrated optical tap monitor 10 of the present invention. As long as integrated tap monitor is oriented in a manner that re-directs the signal into the desired output signal path, the same function of monitoring the multiple wavelength amplified signals and adjusting the positioning of GFF 68 can be achieved.

It is to be understood that the integrated tap monitor of the present invention can be used in systems where it is desired to monitor modulated signals (i.e., measure more than just DC power). In these situations where, for example, a radio-frequency dither signal is monitored, a high-speed photodetector may be required, and used in combination with a trans-impedance amplifier to detect signal levels with frequencies at many GHz (bearing in mind that the size of the optical beam impinging on the HR layer needs to be compatible with the active area of the photodetector).

Although the present invention has been described in terms of the presently-preferred embodiments, it is to be understood that such disclosure is not to be interpreted as limiting. Various alternatives and modifications will no doubt become apparent to those skilled in the art after reading the above disclosure. Accordingly, it is intended that the appended claims be interpreted as covering all alternatives and modification as fall within the true spirit and scope of the invention.

What is claimed is:

1. An optical tap monitor comprising:
   a photodetector including an active region for converting a received optical signal into an electrical equivalent thereof; and
   a high reflectivity coating disposed on an outer surface of the photodetector to create an HR-coated photodetector, the high reflectivity coating configured to reflect a majority of a propagating optical signal impinging the surface thereof, and pass a remaining portion of the propagating optical signal into the active region of the photodetector for conversion into an electrical monitoring signal, the reflected majority of the propagating optical signal forms an optical output signal of the optical tap monitor.

2. The optical tap monitor as defined in claim 1, further comprising
   a housing for enclosing the HR-coated photodetector, the housing including electrical anode and cathode pin connections to the HR-coated photodetector.

3. The optical tap monitor as defined in claim 2 wherein an optical element is disposed within the housing and positioned in optical alignment with the HR-coated photodetector.

4. The optical tap monitor as defined in claim 2 wherein the optical element comprises a tunable optical filter.

5. The optical tap monitor as defined in claim 1 wherein the high reflectivity coating is disposed to cover a surface area of the photodetector that at least matches a beam width of the propagating optical signal.

6. The optical tap monitor as defined in claim 1 wherein the high reflectivity coating is formed of one or more materials selected to provide transmission and reflection for a wide wavelength range.

7. The optical tap monitor as defined in claim 1 wherein the high reflectivity coating is formed of one or more materials selected to restrict transmission and reflection to a predetermined wavelength range.

8. The optical tap monitor as defined in claim 1, further comprising
   a dual fiber collimator disposed in optical alignment with the HR-coated photodetector, the dual fiber collimator including an input fiber, an output fiber, and collimating optics, with the input and output fibers coupled to a first end of the collimating optics and a second, opposing end of the collimating optics disposed to be in optical communication with the high reflectivity coating of the optical tap monitor, such that an optical signal propagating along the input fiber is collimated and thereafter impinges the high reflectivity coating, reflecting a majority of the optical signal back through the collimating optics and into the output fiber and forwarding a portion of the optical signal into the photodetector to be monitored.

9. The optical tap monitor as defined in claim 8, further comprising an optical element disposed in the optical signal path between the collimating optics and the high reflectivity coating.

10. The optical tap monitor as defined in claim 9, wherein the optical element and the HR-coated photodetector are contained within a housing, and the dual fiber collimator is aligned with and connected to the housing.

11. The optical tap monitor as defined in claim 10 wherein the optical element comprises a tunable optical filter.

12. The optical tap monitor as defined in claim 1, wherein the high reflectivity coating is selected from the group consisting of: tungsten, aluminum, copper, zinc, gold, silver, titanium, tantalum, chromium, tin, cobalt, nickel, or any alloys of these materials.

13. The optical tap monitor as defined in claim 1, wherein the optical tap monitor functions as a turning mirror, also providing monitoring functions.

14. The optical tap monitor as defined in claim 1 wherein the photodetector is utilized to monitor modulated optical signals.

15. An integrated optical component comprising
   a broad area photodetector including an active region for converting a received optical signal into an electrical equivalent thereof; and
   a high reflectivity coating disposed on an outer surface of the photodetector to create an HR-coated photodetector, the high reflectivity coating forming a turning mirror to reflect a majority of an incoming optical signal, wherein
   the high reflectivity coating is further configured to pass a portion of the incoming optical signal into the active region of the broad area photodetector for use as an optical monitor signal.

16. An optical tap monitor comprising:
a high-speed photodetector including an active region for converting a received optical signal into an electrical equivalent thereof; and
a high reflectivity coating disposed on an outer surface of the high-speed photodetector to create an HR-coated photodetector, the high reflectivity coating configured to reflect a majority of a propagating optical signal impinging the surface thereof, and pass a remaining portion of the propagating optical signal into the active region of the high-speed photodetector for conversion into an electrical monitoring signal, the reflected majority of the propagating optical signal forming an optical output signal of the optical tap monitor.

17. An optical tap monitor as defined in claim 16 wherein the propagating optical signal exhibits a predetermined beam size compatible with the active region of the high-speed photodetector and the high reflectivity coating is formed to cover a surface area of the high-speed photodetector that is at least substantially the same as the optical signal beam size.

* * * * *